J. C. W. GRETH & M. F. NEWMAN.
WATER PURIFYING APPARATUS.
APPLICATION FILED NOV. 17, 1911.
1,149,045.
Patented Aug. 3, 1915.
2 SHEETS—SHEET 1.
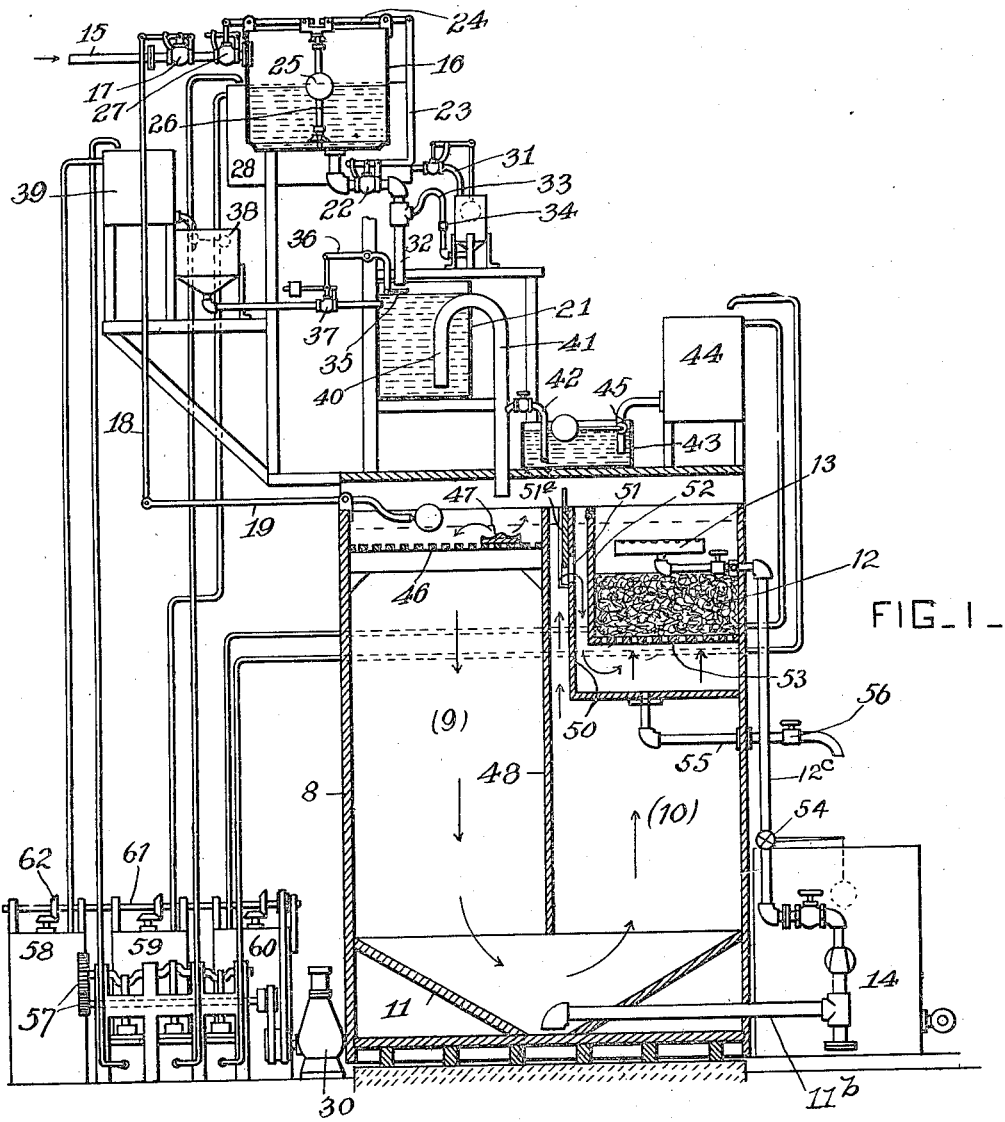
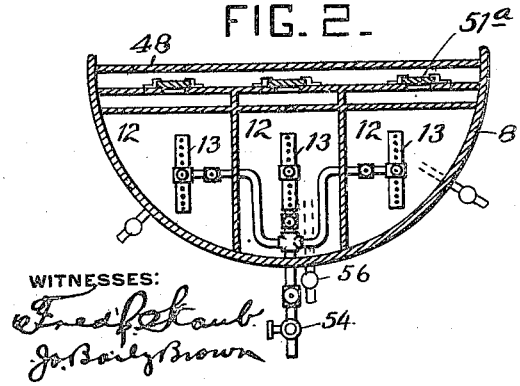

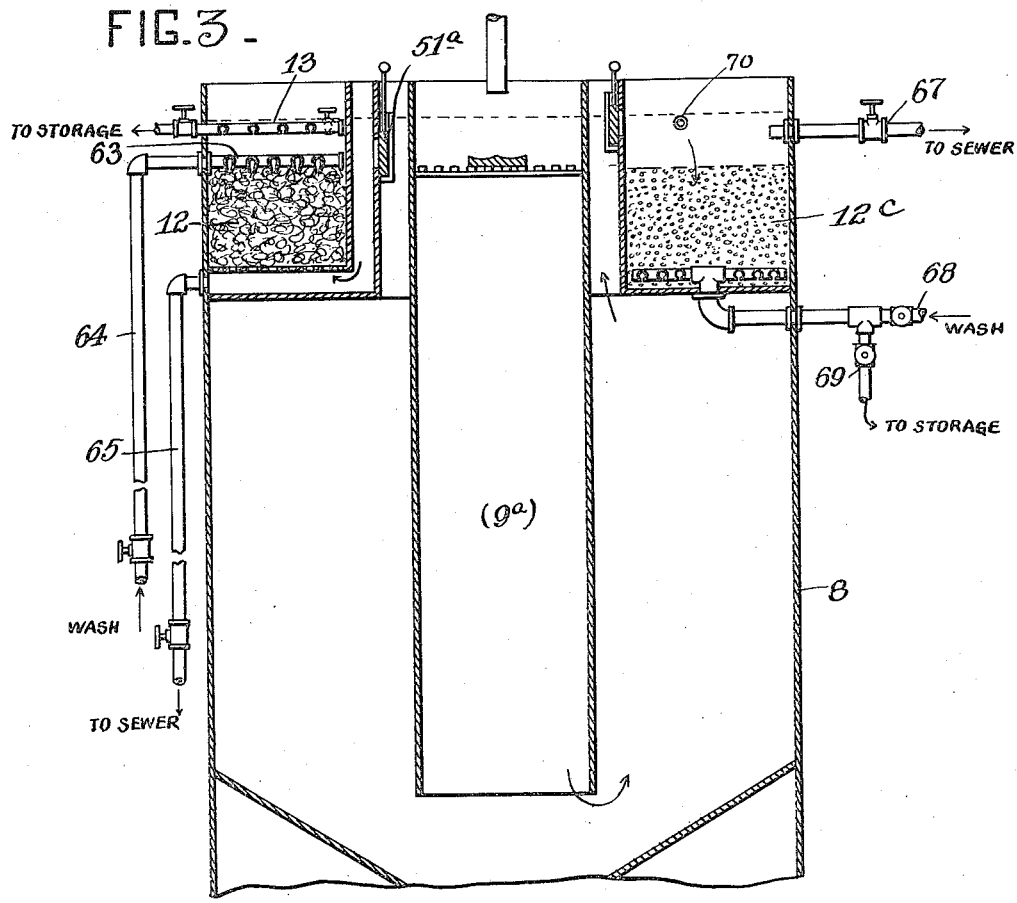
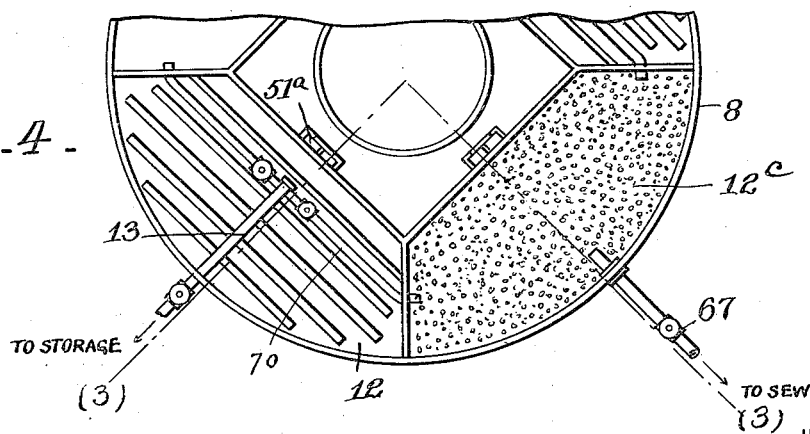

UNITED STATES PATENT OFFICE.

JOHN C. W. GRETH AND MARTIN F. NEWMAN, OF PITTSBURGH, PENNSYLVANIA, ASSIGNORS TO WM. B. SCAIFE & SONS COMPANY, OF PITTSBURGH, PENNSYLVANIA, A CORPORATION OF PENNSYLVANIA.

WATER-PURIFYING APPARATUS.

1,149,045.  Specification of Letters Patent.  Patented Aug. 3, 1915.

Application filed November 17, 1911. Serial No. 660,817.

*To all whom it may concern:*

Be it known that we, JOHN C. W. GRETH and MARTIN F. NEWMAN, both citizens of the United States, residing at Pittsburgh, in the State of Pennsylvania, have jointly invented certain new and useful Improvements in Water-Purifying Apparatus, of which the following is a specification.

Our invention relates to the art of purifying water, and particularly to continuous systems for treating water to reagents, and finally clarifying it.

Among the objects of the invention are, to provide a truly continuous system in which separate reagents are automatically introduced under fixed conditions, and independently and separately regulated in proportions; while continuously operating, clean fiber filters remove the products of the reactions to provide more definite governing means for the flow to and through the filters; to improve the filtering means and provide for washing excelsior or other fibrous material filters; and generally to simplify the action and render more efficient and more certain the operation of continuous systems, as hereinafter more fully set forth.

We have illustrated the invention in several forms in the accompanying drawings, wherein—

Figure 1 is a vertical section and partial elevation showing a complete apparatus embodying part of our invention, and Fig. 2 is a partial sectional plan view of the same. Fig. 3 is a vertical section of another arrangement employing combined filters, the section being on the line marked (3), (3), in Fig. 4, while Fig. 4 is a partial plan of the same arrangement.

In systems heretofore used by others, there has not been independent regulation of the various reagents, even where the reagents have been automatically introduced; in consequence of which, if the water changes composition during treatment, the reagents cannot be separately regulated so as to properly meet the changed conditions. Again there are certain advantages in intermittently introducing the water and reagents, each time under fixed conditions, both of which conditions have been impossible in truly continuous systems heretofore. Again, in continuous systems used heretofore by others, there has been a tendency for the water to set up fixed currents or paths of flow; so that the final admixture of reagents has not been sufficiently intimate; and the final clarification has been imperfect; and it has been impossible to change or wash fiber filters without stopping the flow.

In the apparatus of Fig. 1, the main tank 8 contains a reaction compartment 9 (which may be alternately arranged as at 9ª in Fig. 3 or Fig. 4) and a settling compartment 10. There is an inclined or conical bottom 11 under these, to collect sludge to be carried off by the sewer pipe 11ᵇ and in the settling compartment there is provision for upward flow through a fiber filter 12, as hereinafter described; the water being carried off by pipe 12ᵇ, through intake pipes 13, in the case of Fig. 1 to a ground gravity or pressure filter 14, (which in some cases may be omitted).

The supply of water to the system is by pipe 15 emptying into a feed box 16, after passing through the controlling valve 17 which, by link 18 and lever 19, is automatically regulated by the general level of the water being treated, by a float in any convenient part of the reaction and settling compartments or above filter 12. The box 16 empties by a pipe 32, intermittently, and always in the same time, into a mixing tank 21, after passing through a regulating valve 22, which is opened and closed intermittently by links 23 and 24, operated by the movement of float 25 sliding on a rod 26 in the feed box 16. The movement of this float also opens and closes valve 27 from the supply pipe. That is to say, the water is emptied from box 16 intermittently and each emptying operation occupies a uniform time under similar head, the integrated feeding of water depending only upon the speed of entry through valve 17. It will be understood that when tank 16 is emptied the float 25 strikes the lower button on its spindle, it thereby trips the levers 24, to open the valve 27 and close the valve 22, whereas when it strikes the upper button it raises the spindle 26 and closes valve 27 and simultaneously opens valve 22.

The intermittently flowing water, emptying through the outlet 32 of the pipe, as it enters the tank 21, strikes an impact disk 35 and by the lever 36 opens the regulable valve 37 coming from a constant level reagent feed 38 from a supply tank 39, so that at each influx of water, the apparatus takes in and mixes a given and regulable amount of the first reagent, always under the same conditions, subject to regulation. When the tank 21 is filled, the siphon pipe 40 is discharged and completely empties tank 21, the reagent valve 37 of course closing instantly upon stoppage of the water inflow to tank 21. In the long leg 41 of the siphon is attached a subsidiary siphon 42 which causes an influx of a proportional and regulable amount of a second reagent, under uniform conditions, from the constant level vessel 43 leading from the second reagent supply 44, the float valve 45 opening as required. Also, as the water flows in the discharge pipe 32, a third reagent may be taken through the pipe 33, regulated in amount by valve 34, and coming from a constant level supply vessel fed by pipe 31 from the supply 28 behind the feed box 16.

The water with the reagents mixed in proper proportions therein is discharged through the pipe 41 above the reaction chamber and it strikes a baffle plate 47 designed to thoroughly mix and divide and distribute the stream of water with a rolling upward and outward motion. Thus the water level is suddenly raised over the whole surface above the slatted floor 46, which on account of the restriction of the flow causes a sudden rising of level over the whole area of the reaction tank so that pressure is exerted upon the whole body of water in the reaction tank. This bodily forward movement prevents the setting up of currents, in addition to making use of the entire volume of the reaction compartment. This mode of introduction, causing the body of water in the reaction and settling tanks to be intermittently moved as a whole, avoiding the setting up of limited currents therethrough, we regard as a great improvement over prior systems, quite aside from the distributed introduction, so advantageous in mixing reagents.

An excelsior or fiber filter besides stopping the larger fragments of detritus, causes an acceleration of the chemical action by more intimate admixture therewith. It is liable to rapidly accumulate detritus; and for this reason we arrange it for easy washing as here shown. It will be seen that the water in chamber 10 flows upwardly between the walls 48 and 50 and through one of the ports 51 and thence downward again underneath the filter chamber 52. From here it flows upward through the perforated bottom 53 of the filter 12 to the draw-off pipes 13. These filters 12 are used in multiple as shown in Fig. 2, each filter being in a separate and independent compartment and separately controlled by separate sliding valves 51ª. Thus any one of the filters may be washed in any convenient manner, after opening the valve 56 of pipe 55 and shutting the gate 51ª. Water may be introduced on top of the excelsior filter either by reversing the flow through pipe 12ᵇ, or supplying a separate pipe as shown in Fig. 3, or if desired by squirting in water with a hose. It will be noted that by this means we employ the efficient fibrous filter in the top of the settling tank and yet provide for easily and efficiently washing the detritus out of it without either contaminating the main body of water, or stopping the operation of the system. This is especially advantageous in connection with the sand filters 14 on the ground. That is, the excelsior filter can be used with all its advantages and none of its disadvantages and its superior qualities combined with the advantages of the sand filter 14, which may either be used as an open gravity filter, or used as a pressure filter according to the opening of a valve in the pipe 12ᵇ, as by use of a float-controlled valve 54. Preferably, however, we use separate structures for each type. We have shown a still further improved arrangement of these filters in Figs. 3 and 4.

In Fig. 1 we show apparatus in which the entire system is operated from the ground. The filter 12, here shown as made in triplicate, may of course be multiplied to any number and arranged around a central reaction tank 9ª as in Fig. 3. The sand filters on the ground may of course be fed from all or any one and then from another of the filters 12. In this figure the driving engine 30 for working stirring devices is placed on the ground. By proper driving means, such as gearing 57, it operates a series of pumps which take reagents respectively from the mixing tanks 58, 59 and 60, and lift them respectively to the solution reservoirs 39, 28 and 44, each of which reservoirs has a return pipe as shown so that the level in the supply remains constant. The engine 30 also drives mixing devices in the reagent mixing vessels, as by shaft 61 and proper gearing 62, as will be understood.

As shown in Figs. 3 and 4, we may arrange the series of washable filters in a circle around the inside or outside of the main tank 8 and surrounding a central reaction tank 9ª. For convenience some of these filters may be sand filters and others excelsior filters and we have arranged for washing either and both independently without interrupting the flow and all handled from pipes on the ground. We find it an improvement to provide a special washing sprinkler 63, having a distributed set of perforated nozzles through which jets of water may be sent by pipe 64, with sufficient force to quickly and thoroughly wash the excelsior filters, carrying off the detritus through sewer pipe 65. Meantime, all contamination of the main body of water in the settling tank is prevented by the door 51ª. Likewise the sand filters may be washed in a similar manner by closing the valve in 69 and opening that in 68 as well as the valve 67. We consider very important this novel feature of providing excelsior filters at the top of a settling tank with arrangements to thoroughly wash or renew any one of the units without contamination and without interrupting the flow, and it will be understood that by placing in juxtaposition to them the overflow gravity filters 12$^b$ it will be seen that the water can be sent first through the excelsior filter and then through the gravity filter for final clarification, in a very convenient and effective manner—that is, by the pipe X in Figs. 4 and 5, the water overflows from the excelsior filter onto the neighboring sand filter. The entire system therefore is operated from the ground.

It will be noted that in the apparatus we describe above, the system is entirely continuous and yet each reagent, and the water acted upon thereby, is introduced intermittently but in fixed quantities and with proportions of reagents, which while strictly uniform, may be at any time altered to suit the changing conditions of the water. That is to say, every time one of the vessels 16 and 21 is emptied, it empties exactly the same amount of water in exactly the same time, under exactly the same conditions, and takes in automatically exactly the same amount of reagent; while the total flow is regulated by the number of times per hour, the feeding vessels are emptied. Meantime, the intermittent inflow is equalized in the reaction and settling chambers, (which are proportionally much larger than here shown), and the final outflow is regulated and steadied by the action of the filters. Also the water in the reaction compartment 9 is caused to move bodily forward at each new intake, the water being distributed over the surface and established currents broken up or prevented, eliminating all dead spaces. The filters may be kept constantly washed, or even renewed, without interrupting the flow, and the whole device is supported on one main tank. The filters 14, which may be of any number and may be either pressure or gravity filters, may of course be supported at whatever elevation the water is to be used. When, by the float valve 54, the water is allowed to enter only fast enough to cover the sand surface, the device is a gravity filter, and when closed at the top and acting under head, the device is a pressure filter. In either case we consider it important to combine the excelsior filter inside and at the top of tank 8, with the filters 14 on the ground, because this allows of additional settling before final clarification and as the excelsior filter may be kept clean, it prevents the clogging of the sand filter. The use of the multiple perforated pipes 13 in connection with the excelsior filter prevents short-circuiting, the advantage of which, as well as numerous other advantages of the particular combination shown, will be apparent to those familiar with the art.

In the ground-operated apparatus of Fig. 1 the use of the reagent reservoirs 39, 28 and 44, allows time for making up new solutions in the mixing and storage tanks 58, 59 and 60, without interrupting the continuous introduction of uniform solution and the operation of the system.

By the term "continuous water purifying system" used herein, we mean a system designed to operate without interruption and to introduce reagents and treat and settle the water and thereafter filter the treated water.

Having thus described our invention, what we claim is the following:

1. A continuous flow water treating and clarifying apparatus comprising a reaction compartment, means of supply of reagents, intermittently operating devices for feeding fixed quantities of such reagents into said reaction compartment, governed in time of recurrence by the flow through the system, an upward flow settling compartment, a series of fiber filters at the top of the settling compartment having connections therewith including valved passages whereby the separate filters may be washed in place without contamination of the settling compartment, and means for minimizing sudden fluctuations in flow through the system.

2. A continuous flow water purifying system comprising a reaction chamber, a supply of reagents and means to feed the reagents into the reaction chamber at regulated rates per unit of time, dependent on the flow through the system, an upflow settling compartment connected with the reaction compartment, a series of independent fiber filters located at the top of the settling compartment, but each inclosed in a supplemental chamber adapted to take the water from the top surface in the settling chamber and conduct it upwardly through said fiber filters by the action of gravity, said inclosing chamber of each fiber filter being provided with proper connections to reverse the flow of water through the filter and wash each filter in place without interrupting the flow through the entire system or contaminating the water in the settling compartment, whereby the chemical reaction is continued in the clarifying device and without permanently clogging said clarifying device.

3. A continuous water treating and clarifying apparatus comprising treatment and settling compartments, reagent supplies and reagent feeding means, and in the top of the settling compartment a horizontally arranged series of fiber filters connected with said settling compartment to take water therefrom and pass it upward through the filter, and alternately with the fiber filters, a series of gravity sand filters communicating therewith, said fiber filters being in boxes in turn inclosed in supplemental vessels with connections adapted to independently wash them in place so that the reaction and clarifying may be continuous and the filters kept constantly clean without contaminating the settling compartment, substantially as described.

4. A continuous flow water treating and clarifying apparatus comprising a treatment compartment, a settling compartment connected with the bottom of the treatment compartment, a series of independent filter units located at the top of the settling compartment and fed by gravity therefrom, including filter units of fiber contained in a vessel closed except at the bottom, and in turn inclosed in a vessel closed except at the top, means to intermittently feed regulated quantities of reagents to the treatment compartment, and connections for said filters whereby each of them may be washed in place without contaminating the settling compartment and without interrupting the flow through the system, substantially as described.

In testimony whereof we have hereunto signed our names in the presence of the two subscribed witnesses.

JOHN C. W. GRETH.
MARTIN F. NEWMAN.

Witnesses:
F. W. H. CLAY,
FRED'K STAUB.